United States Patent [19]

Morishita et al.

[11] 4,378,091
[45] Mar. 29, 1983

[54] ROTARY TYPE ELECTROSTATIC SPRAY PAINTING DEVICE

[75] Inventors: Teru Morishita, Shizuoka; Matsuyoshi Sugiyama, Susono; Toshikazu Suzuki, Toyota, all of Japan

[73] Assignee: Toyota Jidosha Kabushiki Kaisha, Toyota, Japan

[21] Appl. No.: 195,926

[22] Filed: Oct. 10, 1980

[30] Foreign Application Priority Data

May 21, 1980 [JP] Japan .................. 55-066367

[51] Int. Cl.³ .............................. B05B 5/04
[52] U.S. Cl. .................... 239/703; 239/128; 308/10; 384/107
[58] Field of Search .............. 239/700–703, 239/214, 223, 224, 128; 308/9, 10, DIG. 1

[56] References Cited

U.S. PATENT DOCUMENTS

| 1,906,715 | 5/1933 | Penick | 308/9 |
|---|---|---|---|
| 3,063,642 | 11/1962 | Point | 239/15 |
| 3,083,911 | 4/1963 | Griffiths | 239/15 |
| 3,121,533 | 2/1964 | Sedlacsik, Jr. | 239/15 |
| 3,128,045 | 4/1964 | Gauthier | 239/15 |
| 3,130,066 | 4/1964 | Brady | 117/93.43 |
| 3,155,539 | 11/1964 | Juvinall | 118/11 |
| 3,248,606 | 4/1966 | Fraser | 317/3 |
| 3,281,076 | 10/1966 | Burnside et al. | 239/7 |
| 3,504,851 | 4/1970 | Demeter | 239/15 |
| 3,512,502 | 5/1970 | Drum | 118/624 |
| 3,620,581 | 11/1971 | Heller et al. | 308/9 |
| 3,873,024 | 3/1975 | Probst | 239/15 |
| 3,985,405 | 10/1976 | Okano et al. | 308/DIG. 1 X |
| 4,128,280 | 12/1978 | Purtschert | 308/10 X |
| 4,148,932 | 4/1979 | Tada et al. | 239/700 X |

FOREIGN PATENT DOCUMENTS

| 2336181 | 7/1977 | France | 239/703 |
| 1213959 | 11/1970 | United Kingdom | 308/9 |

Primary Examiner—Andres Kashnikow
Attorney, Agent, or Firm—Kenyon & Kenyon

[57] ABSTRACT

A rotary type electrostatic spray painting device is provided with a rotary shaft and a spray head fixed onto the front end of the rotary shaft. Paint is fed onto the cup-shaped inner wall of the spray head. The rotary shaft is supported in a no-contact state by a single thrust air bearing, a pair of radial air bearings, and a magnetic bearing arranged between the radial air bearings. An electrode for providing continuous electrical contact with the rear end of the rotary shaft, is cooled by being at least partially arranged in a flow path of compressed air. A negative high voltage is applied to the housing of the painting device, which is applied to the spray head via the electrode and the rotary shaft.

24 Claims, 9 Drawing Figures

ROTARY TYPE ELECTROSTATIC SPRAY PAINTING DEVICE

BACKGROUND OF THE INVENTION

The present invention relates to a rotary type electrostatic spray painting device.

One known electrostatic spray painting device which has been used for painting, for example, bodies of motor cars, is of the rotary type and comprises a rotary shaft supported by ball bearings or roller bearings arranged within the housing of the painting device, and a cup shaped spray head fixed onto the front end of the rotary shaft. In this painting device, a negative high voltage is applied to the spray head, and paint is fed onto the inner circumferential wall of the spray head. Thus, fine paint particles charged with electrons are sprayed from the spray head and are attracted by an electrostatic force onto the surface of the body of a motor car, which is grounded. As a result of this, the surface of the body of a motor car is painted. In such a rotary type electrostatic spray painting device, about 90 percent of the paint sprayed from the spray head, can be efficiently used for painting the surface to be painted. Thus, the amount of the paint which is wasted is small and, as a result, rotary type electrostatic spray painting devices are used in various industries.

In order to form a beautifully finished surface when a surface is painted by using a spray paint, it is necessary to reduce the size of the particles of paint as much as possible. In rotary spray painting arrangements wherein the paint is divided into fine particles by operation of a centrifugal force which results from the rotation of a spray head, the strength of the centrifugal force, that is, the rotating speed of the spray head, has a great influence on the size of the particles of paint. In other words, the higher the rotating speed of the spray head, the smaller the size of the particles of paint. Consequently, in order to form a beautifully finished surface by using a rotary type electrostatic spray painting device, it is necessary to increase the rotating speed of the spray, head as much as possible. As mentioned above, in a conventional rotary type electrostatic spray painting device, ball bearings or roller bearings are used for supporting the rotary shaft of the electrostatic spray painting device and, in addition, a lubricant, such as grease, is confined within the ball bearings or the roller bearings. However, when such bearings, which are lubricated by grease, are rotated at a high speed, the bearings instantaneously deteriorate. Therefore, in a conventional rotary type electrostatic spray painting device having bearings which are lubricated by grease, the maximum rotating speed of the rotary shaft, and therefore, the maximum rotating speed of the spray head, is at most 20,000 r.p.m. However, in the case wherein the rotating speed of the spray head is about 20,000 r.p.m., the size of the particles of paint is relatively large and, thus, it is difficult to form a beautifully finished surface. In the field of manufacturing motor cars, the painting process for bodies of motor cars comprises a primary spraying step, an undercoating step, and a finish painting step. However, since it is difficult to form a beautifully finished surface by using a conventional rotary type electrostatic spray painting device as mentioned above, such a conventional rotary type electrostatic spray painting device has been used for the undercoating step, but not the finish printing step.

A jet lubricating system is known wherein low viscosity lubricating oil is injected into the region between the inner race and the outer race of the ball or roller bearing. The friction between the ball or roller and such races is greatly reduced and, at the same time, the heat caused by the friction is absorbed by the lubricating oil. In arrangements where the above-mentioned jet lubricating system is applied to a rotary type electrostatic spray painting device, it is possible to increase the rotating speed of the rotary shaft of the electrostatic spray painting device as compared with arrangements where grease lubricated bearings are used. However, since the jet lubricating system requires a complicated lubricating oil feed device having a large size, it is particularly difficult to apply such a jet lubricating system to a rotaty type electrostatic spray painting device. In addition, if the lubricating oil mixes with the paint, the external appearance of the painted surface is damaged. Therefore, if the jet lubricating system is applied to a rotary type electrostatic spray painting device, it is necessary to completely prevent the lubricating oil from leaking into the paint. However, it is practically impossible to completely prevent the lubricating oil from leaking into the paint and, thus, it is inadvisable to apply the jet lubricating system to a rotary type electrostatic spray painting device.

A further known painting device which is capable of reducing the size of the particles of paint to a great extent employs an air injection arrangement in which the paint is divided into fine particles by the stream of injection air. In this air injection type electrostatic spray painting device, since the size of the particles of sprayed paint can be reduced to a great extent, as mentioned above, it is possible to form a beautifully finished surface. Consequently, air injection type electrostatic spray painting devices have been employed to perform the finish painting step for the bodies of motor cars. However, in such air injection type electrostatic spray painting devices the sprayed paint impinges upon the surface to be painted together with the stream of the injection air, and a large amount of the sprayed paint escapes with the stream of the injection air, without adhering to the surface to be painted. In such systems the amount of the paint used to effectively paint the surface to be painted is about 40 percent of the amount of the paint sprayed from the electrostatic spray painting device. Consequently, situations where an air injection type electrostatic spray painting device is used, the consumption of the paint is inevitably increased. In addition, in this case, a problem occurs in that the paint escaping, together with the stream of the injection air, causes air pollution within factories.

It is, therefore, object of the present invention to provide a rotary type electrostatic spray painting device capable of reducing the size of the particles of paint to be sprayed and the quantity of paint used.

SUMMARY OF THE INVENTION

According to the present invention, there is provided a rotaty type electrostatic spray painting device which comprises a metallic housing; a metallic rotary shaft rotatably arranged in said housing and having a front end and a rear end; a cup shaped metallic spray head fixed onto the front end of said rotary shaft and having a cup shaped inner wall. The device further comprises feed means for feeding a paint onto said cup shaped inner wall; drive means cooperating with said rotary shaft for rotating said rotary shaft; non-contact type radial air bearing means arranged in said housing and cooperating with said ratoray shaft for radially supporting said rotary shaft under a non-contacting state; non-contact type radial magnetic bearing means arranged in said housing and cooperating with said rotary shaft for radially supporting said rotary shaft under a non-contacting state; and non-contact type thrust bearing means arranged in said housing and cooperating with said rotary shaft for axially supporting said rotary shaft under a non-contacting state. A negative high voltage is received at a terminal which is connected to said housing, and an electrode is arranged in said housing for electrically connecting said terminal to said spray head.

The present invention may be more fully understood from the description of preferred embodiments of the invention set forth below, together with the accompanying drawings.

DETAILED DESCRIPTION OF PREFERRED EMBODIMENTS

Figure 1:
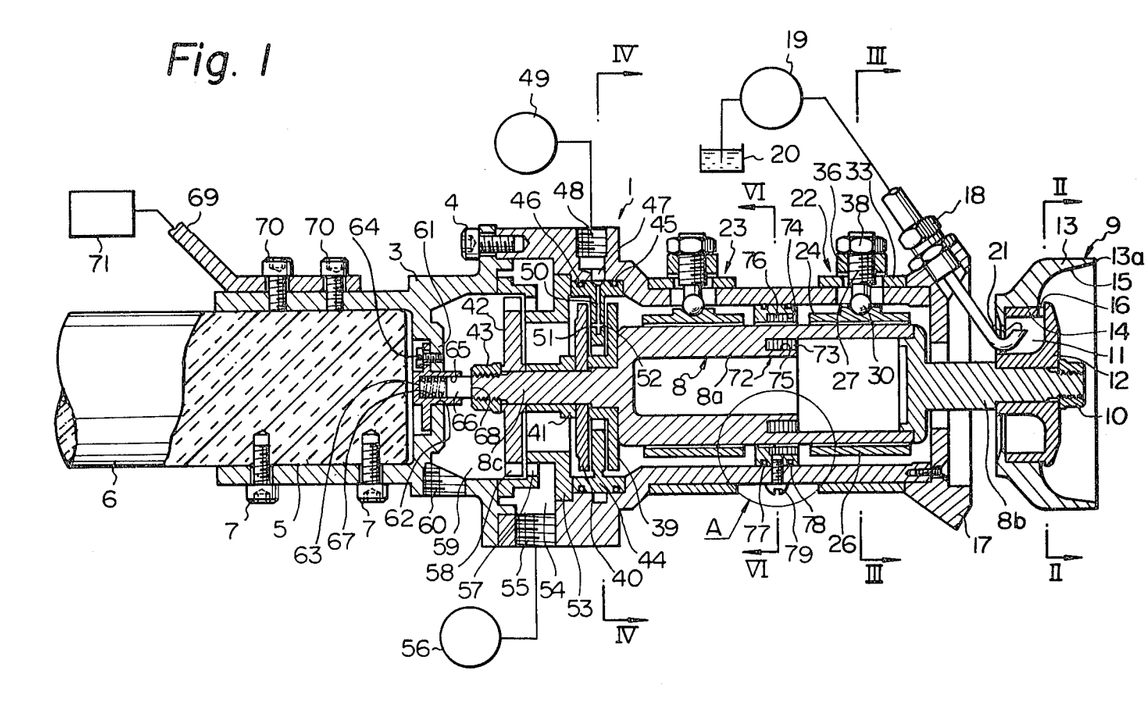
FIG. 1 is a cross-sectional side view of an embodiment of a rotary type electrostatic spray paint device according to the present invention.
Figures 2, 3:
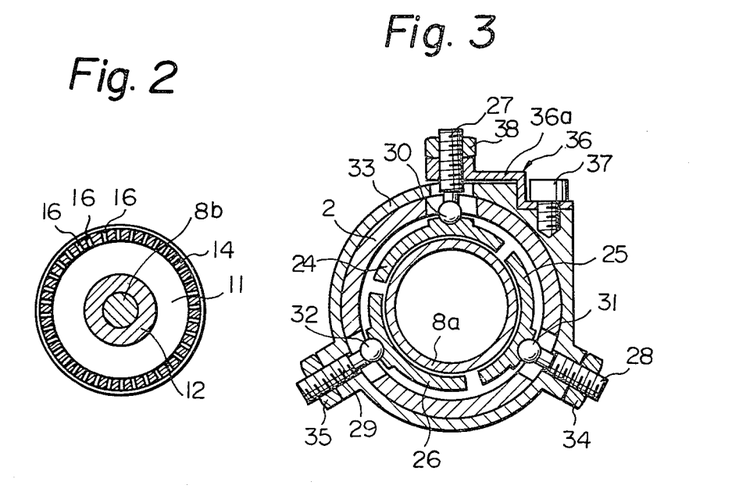
FIG. 2 is a cross-sectional view taken along the line II—II in FIG. 1.
FIG. 3 is a cross-sectional view taken along the line III—III in FIG. 1.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod 5, made of electrically insulating material 6 is fitted into a cylindrical hole 5 formed in the rear housing 3, and this rear housing 3 is fixed onto the support rod 6 by bolts 7. The support rod 6 is supported by a base (not shown). A rotaty shaft 8 is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 spaced from the outer circumferential wall of the hollow cylindrical portion 8a of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29 and are in engagement with spherical recesses formed on the rear faces of the pads 24, 25, 26, respectively. Consequently, the pads 24, 25, 26 can swing about the corresponding spherical tips 30, 31, 32 each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36a is fixed onto the bearing support frame 33 by means of a bolt 37, and the other end of the support arm 36 is fixed onto the support pin 27 by means of a nut 38. Consequently, the pad 24 is urged onto the hollow cylindrical portion 8a of the rotary shaft 8 due to the resilient force of the support arm 36.

Figure 4:
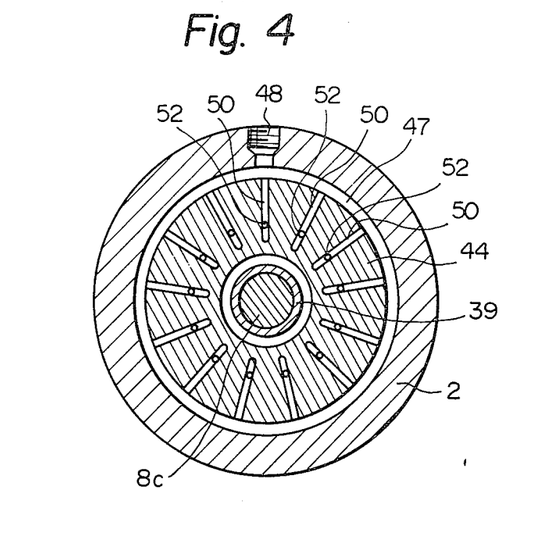
FIG. 4 is a cross-sectional view taken along the line IV—IV in FIG. 1.

Turning to FIG. 1, a pair of disc-shaped runners 39, 40 is inserted into the shaft portion 8c of the rotary shaft 8 and fixed onto the shaft portion 8c via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is spaced from the annular plate 44 by a slight distance. The annular plate 44 is fixed onto the front housing 2 via a pair of O-rings 45, 46. As illustrated in FIGS. 1 and 4, an annular groove 47, extending along the outer circumferential wall of the annular plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51, each extending towards the runner 40 from the inner end portion of the corresponding air passage 50, is formed in the annular plate 44, and a plurality of air outflow bores 52, each extending towards the runner 39 from the inner end portion of the corresponding air passage 50, if formed in the annular plate 44.

As illustrated in FIG. 1, a turbine nozzle holder 53 is fixed onto the front housing 2 at a position adjacent to the annular plate 44, and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60. Electrode 66 is, as shown, arranged in chamber 59 and is therefore subjected to the cooling effect of the compressed air as it passes through the chamber and discharges into the atmosphere.

A through-hole 62 is formed on an end wall 61 of the rear housing 3, which defines the housing interior chamber 59, and an electrode holder 63 extending through the through hole 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8c of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from −60 kV to −90 kV. Consequently, the negative high voltage is applied to both the front housing 2 and the rear housing 3, and it is also applied to the spray head 9 via the electrode 66 and the rotary shaft 8.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, a negative high voltage is applied to the spray head 9. Consequently, when the paint is sprayed from the tip 13a of the spray head body 13 in the form of fine particles, the particles of the sprayed paint are charged with electrons. Since the surface to be painted is normally grounded, the paint particles charged with electrons are attracted towards the surface to be painted due to electrical force and, thus, the surface is painted.

As mentioned previously, the rotary shaft 8 is supported by a pair of tilting pad radial air bearings 22, 23 and a single thrust air bearing which is constructed by the runners 39, 40 and the stationary annular plate 44. In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called "wedge effect" of air, and therefore, the pressure of the air between the hollow cylindrical portion 8a and the pads 24, 25, 26 is increased. As a result of this, the force radially supporting the rotary shaft 8 is generated between the hollow cylindrical portion 8a and the pads 24, 25, 26. On the other hand, in the above-mentioned thrust air bearing, compressed air is fed into the air passages 50 from the air feed pumps 49 via the annular groove 47. Then, the compressed air is injected from the air outflow bores 51 into the clearance between the annular plate 44 and the runner 40, and also, injected from the air outflow bores 52 into the clearance between the annular plate 44 and the runner 39. As a result of this, the pressure, which is necessary to maintain the above-mentioned clearances formed on each side of the annular plate 44, is generated between the annular plate 44 and the runners 39, 40. Consequently, the rotary shaft 8 is supported by the thrust air bearing and a pair of the radial air bearings under a non-contacting state via a thin air layer. As is known to those skilled in the art, the coefficient of viscosity of air is about one thousandth of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 5:
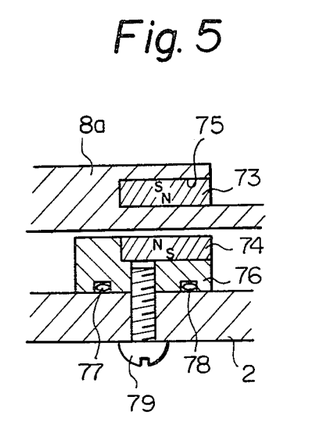
FIG. 5 is an enlarged cross-sectional side view of a portion enclosed by the circle A in FIG. 1.
Figure 6:
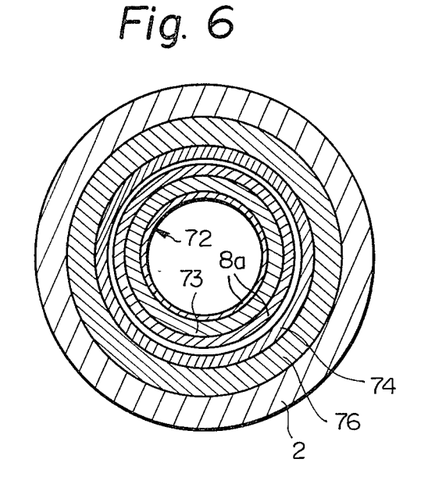
FIG. 6 is a cross-sectional view taken along the line VI—VI in FIG. 1.

In the tilting pad radial air bearing 22 in which the entire outer circumferential wall of the rotary shaft 8 is surrounded by a noncontinuous bearing surface, as illustrated in FIG. 3, since it is possible to maintain the stable thin air layer between the rotary shaft 8 and the pads 24, 25, 16 only when the rotating speed of the rotary shaft 8 is increased to a great extent, it is advisable to apply the tilting pad radial air bearing to a rotary shaft rotating at a high speed. In addition, it is also advisable to apply a foil bearing (not shown) to a rotary shaft rotating at a high speed. Consequently, in the present invention, instead of using the tilting pad radial air bearing 22, such a foil bearing may be used. However, in such a tilting pad radial air bearing and a foil bearing, when the rotary shaft 8 is stopped or the rotating speed of the rotary shaft 8 is extremely low, since the force, supporting the rotary shaft 8, is not produced between the bearing and the rotary shaft 8, the rotary shaft 8 comes into contact with the bearing. Therefore, if the starting and the stopping of the rotation of the rotary shaft 8 are repeated, the rotary shaft 8 comes into contact with the bearing everytime the rotation of the rotary shaft 8 is stopped or started. As a result of this, the bearing wears. In an air bearing such as the tilting pad radial air bearing and the foil bearing, even a slight wear of the bearing has a great influence on the performance of the bearing. Consequently, in the case wherein such an air bearing is used for supporting the rotary shaft 8, it is necessary to prevent the rotary shaft 8 from coming into contact with the bearing. To this end, in the rotary type electrostatic spray painting device according to the present invention, as illustrated in FIG. 1, a magnetic bearing 72 is provided between the tilting pad radial air bearings 22 and 23 for supporting the rotary shaft 8 by using the repulsion force of a permanent magnet. As illustrated in FIGS. 1 and 6, the magnetic bearing 72 comprises an annular permanent magnet 73 fixed onto the rotary shaft 8, and an annular permanent magnet 74 arranged at the exterior of the rotary shaft 8. An annular recess 75 is formed on the inner wall of the hollow cylindrical portion 8a of the rotary shaft 8, and the permanent magnet 73 is fitted into the annular recess 75. On the other hand, the permanent magnet 74 is fixed onto a ring-shaped magnet holder 76, which is secured onto the inner wall of the front housing 2, via a pair of O-rings 77, 78 by means of a bolt 79. As illustrated in FIG. 5, the permanent magnet 74 is so arranged that it is spaced from the outer circumferential wall of the hollow cylindrical portion 8a of the rotary shaft 8 by a slight distance. In addition, the permanent magnets 73, 74 are so arranged that, for example, the polarity of the outside of the permanent magnet 73 is "N", and the polarity of the inside of the permanent magent 74 is "N". Consequently, the repulsion force acts between the permanent magnets 73 and 74, and the rotary shaft 8 is supported by the repulsion force under a non-contacting state with respect to the permanent magnet 74. Even if the rotation of the rotary shaft 8 is stopped, the supporting force of the rotary shaft 8, which is caused by the repulsion force, is maintained. Consequently, it is possible to prevent the rotary shaft 8 from coming into contact with the tilting pad radial air bearings 22, 23.

Figure 7:
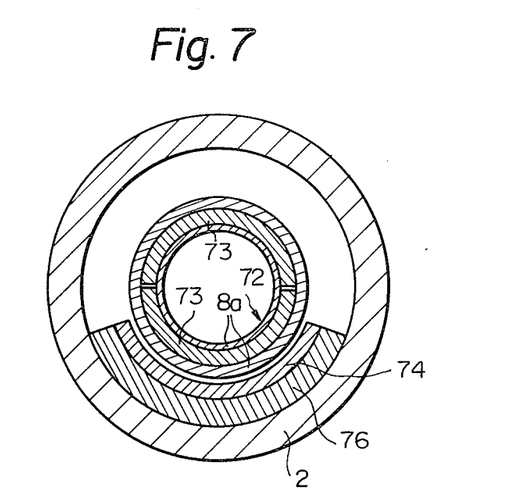
FIG. 7 is a cross-sectional view of another embodiment according to the present invention.

FIG. 7 illustrates another embodiment. In this embodiment, the annular permanent magnet 73, fixed onto the rotary shaft 8, comprises a pair of split permanent magnets, and the permanent magnet 74, fixed onto the magnet holder 76 and having a sector shape, is arranged only beneath the hollow cylindrical portion 8a of the rotary shaft 8. As mentioned above, since the magnetic bearing 72 comprising the permanent magnets 73 and 74 is provided for supporting the rotary shaft 8 only when the rotation of the rotary shaft 8 is stopped, it is sufficient that the magnetic bearing 72 provides the force lifting the rotary shaft 8 upward. Therefore, as illustrated in FIG. 7, the permanent magnet 74 may be arranged only beneath the hollow cylindrical portion 8a of the rotary shaft 8.

Figure 8:
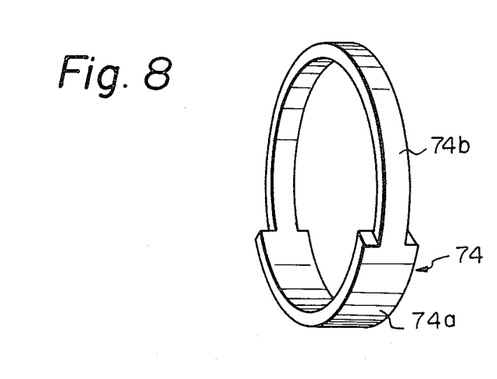
FIG. 8 is a perspective view of a modification of the permanent magnet illustrated in FIG. 1.

FIG. 8 illustrates a modification of the permanent magnet 74 illustrated in FIGS. 1 and 6. In this embodiment, the permanent magnet 74 is so formed that the upper portion 74b of the permanent magnet 74 has a width which is narrower than that of the lower portion 74a of the permanent magnet 74. In any embodiments hereinbefore described, it is preferable that rare-earth cobalt magnets be used as the permanent magnets 73, 74.

Figure 9:
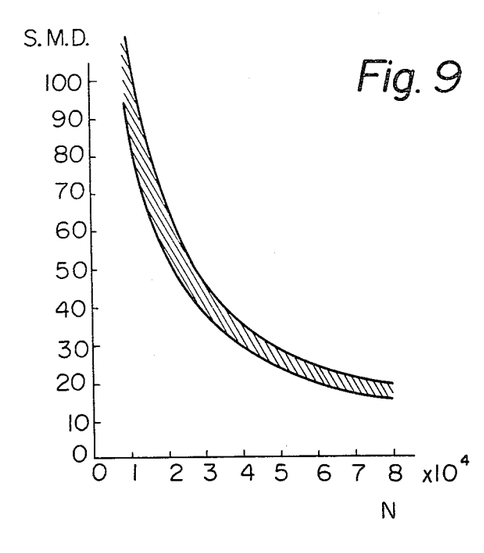
FIG. 9 is a graph showing the relationship between the size of paint particles and the rotating speed of the spray head.

FIG. 9 illustrates the relationship between the size of the particles of sprayed paint and the rotating speed of the spray head in the case wherein the spray head 9 (FIG. 1) having a diameter of 75 mm is used. In FIG. 9, the ordinate S.M.D. indicates the means diameter ($\mu$m) of paint particles, which is indicated in the form of a Sauter means diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 9, it will be understood that, if the spray head having a diameter of 75 mm is used in a conventional rotary type electrostatic spray painting device, the minimum mean diamter S.M.D. of paint particles is in the range of 55 $\mu$m to 65 $\mu$m. Contrary to this, in the present invention, the maximum number of revolutions per minute N is about 80,000 r.p.m. Consequently, from FIG. 9, it will be understood that the paint can be divided into fine particles to such a degree that the mean diameter S.M.D. of paint particles is in the range of 15 $\mu$m to 20 $\mu$m. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3, and the rotary shaft 8. Consequently, there is no danger that an electric discharge will occur between the housings 2, 3 and the rotary shaft 8.

According to the present invention, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced. Furthermore, when the rotation of the rotary shaft is stopped or when the rotating speed of the rotary shaft becomes extremely low, since the rotary shaft does not come into contact with the radial air bearings, the life of the radial bearings can be lengthened over the prior art.

While the invention has been described by reference to specific embodiments chosen for purposes of illustration, it should be apparent that numerous modifications could be made thereto by those skilled in the art without departing from the basic concept and scope of the invention.

We claim:

1. A rotary type electrostatic spray painting device comprising:
   a metallic housing;
   a metallic rotary shaft rotatably arranged in said metallic housing and having a front end and a rear end, said metallic rotary shaft further having a hollow portion having a first diameter and arranged axially contiguous with and intermediate of first and second solid portions arranged at said front and rear ends, respectively, said first and second solid portions having respective diameters which are smaller than said first diameter;
   a cup-shaped metallic spray head fixed onto said first solid portion at said front end of said metallic rotary shaft and having a cup-shaped inner wall;

feeding means for feeding a paint onto said cup-shaped inner wall;

drive means cooperating with said rotary shaft for rotating said rotary shaft;

non-contact type radial air bearing means arranged in said metallic housing and arranged with respect to said metallic rotary shaft so as to be adjacent to said hollow portion of said metallic rotary shaft for radially supporting said metallic rotary shaft in a non-contacting state;

non-contact type radial magnetic bearing means arranged in said metallic housing and cooperating with said metallic rotary shaft for radially supporting said rotary shaft in a non-contacting state;

non-contact type thrust bearing means arranged in said metallic housing and arranged with respect to said metallic rotary shaft so as to be adjacent to said second solid portion for axially supporting said metallic rotary shaft in a non-contacting state;

terminal means for receiving a negative high voltage, said terminal means being connected to said housing; and electrode means arranged in said housing for electrically coupling said terminal means to said spray head.

2. A rotary type electrostatic spray painting device as claimed in claim 1, wherein said non-contacting radial magnetic bearing means comprises a first permanent magnet fixed onto said metallic rotary shaft, and a second permanent magnet fixed onto said metallic housing and radially spaced from said first permanent magnet, a radially outer surface of said first permanent magnet having a magnetic polarity which is the same as that of a radially inner surface of said second permanent magnet.

3. A rotary type electrostatic spray painting device as claimed in claim 2, wherein said first permanent magnet has an annular shape.

4. A rotary type electrostatic spray painting device as claimed in claim 3, wherein said first permanent magnet comprises split permanent magnets.

5. A rotary type electrostatic spray painting device as claimed in claim 3, wherein said housing has a hollow cylindrical portion having an inner wall which has an annular recess formed thereon, said second permanent magnet being fitted into said annular recess.

6. A rotary type electrostatic spray painting device as claimed in claim 2, wherein said second permanent magnet has an annular shape.

7. A rotary type electrostatic spray painting device as claimed in claim 6, wherein said second permanent magnet has an upper portion, and a lower portion having an axial width which is larger than that of said upper portion.

8. A rotary type electrostatic spray painting device as claimed in claim 2, wherein said second permanent magnet has a sector shape and is arranged beneath said metallic rotary shaft.

9. A rotary type electrostatic spray painting device as claimed in claim 2, wherein said second permanent magnet is fixed onto a magnet holder which is secured onto an inner wall of said metallic housing.

10. A rotary type electrostatic spray painting device as claimed in claim 1, wherein said non-contact type radial air bearing means comprises a pair of radial air bearings, said non-contact type radial magnetic bearing means being arranged between said radial air bearings.

11. A rotary type electrostatic spray painting device as claimed in claim 10, wherein each of said radial air bearings comprises a bearing frame connected to said metallic housing, a plurality of pads, each having an inner face which extends along a circumferential outer wall of said metallic rotary shaft and arranged to be spaced from said circumferential outer wall of said metallic rotary shaft by a slight distance, and a plurality of support pins, each being connected to said bearing frame and pivotally supporting a corresponding one of said pads.

12. A rotary type electrostatic spray painting device as claimed in claim 11, wherein each of said radial air bearings further comprises a resilient arm through which a selected one of said support pins is connected to said bearing frame for biasing said corresponding one of said pads to said circumferential outer wall of said metallic rotary shaft.

13. A rotary type electrostatic spray painting device as claimed in claim 11, wherein each of said pads has an outer wall forming a spherical recess thereon, each of said support pins having a spherical tip which is in engagement with said spherical recess of said corresponding pad.

14. A rotary type electrostatic spray painting device as claimed in claim 1, wherein said non-contact type thrust bearing means comprises a thrust air bearing.

15. A rotary type electrostatic spray painting device as claimed in claim 14, wherein said non-contact type thrust bearing means further comprises means for receiving compressed air, said thrust air bearing further comprising a stationary annular plate having opposed side walls, and a pair of runners fixed onto said metallic rotary shaft and arranged on each side of said annular plate, each of said runners being spaced from the corresponding side wall of said annular plate, a plurality of air outflow bores connected to said means for receiving compressed air and being formed on the opposed side walls of said annular plate.

16. A rotary type electrostatic spray painting device as claimed in claim 15, wherein said annular plate forms therein a plurality of radially extending air passages, each connecting said corresponding air outflow bore to said means for receiving compressed air.

17. A rotary type electrostatic spray painting device as claimed in claim 1, wherein said electrode means comprises an electrode which is arranged to be in continuous contact with said rear end of said metallic rotary shaft.

18. A rotary type electrostatic spray painting device as claimed in claim 17, wherein said electrode is made of carbon.

19. A rotary type electrostatic spray painting device as claimed in claim 17, wherein said second solid portion at said rear end of said metallic rotary shaft has a flat end face oriented perpendicular to a rotation axis of said metallic rotary shaft, said electrode being arranged coaxially with said rotation axis of said metallic rotary shaft and having a flat end face which is in contact with said flat end face of said metallic rotary shaft.

20. A rotary type electrostatic spray painting device as claimed in claim 17, wherein said electrode means further comprises an electrode holder fixed onto said metallic housing and having therein a cylindrical bore, into which said electrode is slidably inserted, and a compression spring arranged in said cylindrical bore of said electrode holder between said electrode holder and said electrode.

21. A rotary type electrostatic spray painting device as claimed in claim 1, wherein said drive means comprises an air injection nozzle arranged in said housing for conducting air under pressure, and a turbine wheel fixed onto said metallic rotary shaft and having a turbine blade which is arranged to face said air injection nozzle.

22. A rotary type electrostatic spray painting device as claimed in claim 1, wherein said cup-shaped spray head comprises a cylindrical inner wall arranged coaxially with the rotation axis of said metallic rotary shaft and defining therein an annular space, a plurality of paint outflow bores being formed in said cylindrical inner wall of said spray head and smoothly connected to said cup-shaped inner wall of said spray head, said feed means having a paint injection nozzle which is arranged in said annular space.

23. A rotary type electrostatic spray painting device comprising:

a metallic housing;

a metallic rotary shaft rotatably arranged in said metallic housing and having a front end and a rear end, said metallic rotary shaft further having a hollow portion having a first diameter and arranged axially contiguous with and intermediate of first and second solid portions arranged at said front and rear ends, respectively, said first and second solid portions having respective diameters which are smaller than said first diameter;

a cup-shaped metallic spray head fixed onto said first solid portion at said front end of said metallic rotary shaft and having a cup-shaped inner wall;

feeding means for feeding a paint onto said cup-shaped inner wall;

drive means cooperating with said metallic rotary shaft for rotating said metallic rotary shaft;

non-contact type radial air bearing means arranged in said metallic housing and arranged with respect to said metallic rotary shaft so as to be adjacent to said hollow portion of said metallic rotary shaft for radially supporting said metallic rotary shaft in a non-contacting state;

non-contact type radial magnetic bearing means arranged in said metallic housing, said magnetic bearing means having an annular shape, and cooperating with said hollow portion of said metallic rotary shaft for radially supporting said metallic rotary shaft in a non-contacting state;

non-contact type thrust bearing means arranged in said metallic housing and arranged with respect to said metallic rotary shaft so as to be adjacent to said second solid portion for axially supporting said metallic rotary shaft in a non-contacting state;

terminal means for receiving a negative high voltage, said terminal means being connected to said metallic housing; and electrode means arranged in said metallic housing for electrically coupling said terminal means to said spray head.

24. A rotary type electrostatic spray painting device comprising:

a metallic housing;

a metallic rotary shaft rotatably arranged in said metallic housing and having a front end and a rear end, said metallic rotary shaft further having a hollow portion having a first diameter and arranged axially contiguous with and intermediate of first and second solid portions arranged at said front and rear ends, respectively, said first and second solid portions having respective diameters which are smaller than said first diameter;

a cup-shaped metallic spray head fixed onto said first solid portion at said front end of said metallic rotary shaft and having a cup-shaped inner wall;

feeding means for feeding a paint onto said cup-shaped inner wall;

drive means cooperating with said metallic rotary shaft for rotating said metallic rotary shaft;

air supply coupling means for receiving air under pressure and introducing said compressed air into said metallic housing, said compressed air flowing within said metallic housing along at least a first predetermined air path;

non-contact type radial air bearings means arranged in said metallic housing and arranged with respect to said metallic rotary shaft so as to be adjacent to said hollow portion of said metallic rotary shaft for radially supporting said metallic rotary shaft in a non-contacting state;

non-contact type radial magnetic bearing means arranged in said metallic housing and cooperating with said metallic rotary shaft for radially supporting said metallic rotary shaft in a non-contacting state;

non-contact type thrust bearing means arranged in said metallic housing and arranged with respect to said metallic rotary shaft so as to be adjacent to said second solid portion for axially supporting said metallic rotary shaft in a non-contacting state;

terminal means for receiving a negative high voltage, said terminal means being connected to said metallic housing; and electrode means arranged in said metallic housing for electrically coupling said terminal means to said spray head, at least a portion of said electrode means being arranged in said first predetermined air path for cooling said electrode means.

* * * * *